(12) United States Patent
Laster (10) Patent No.: US 10,054,684 B2
(45) Date of Patent: Aug. 21, 2018

(54) CASTABLE SONAR DEVICE

(71) Applicant: Navico Holding AS, Egersund (NO)

(72) Inventor: Matthew Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 440 days.

(21) Appl. No.: 14/806,635

(22) Filed: Jul. 22, 2015

(65) Prior Publication Data

US 2017/0023676 A1 Jan. 26, 2017

(51) Int. Cl.
| | | |
|---|---|---|
| *G01S 15/96* | (2006.01) | |
| *G01S 7/521* | (2006.01) | |
| *G01S 19/13* | (2010.01) | |
| *G01S 7/62* | (2006.01) | |
| *G01S 15/89* | (2006.01) | |
| *G01S 7/524* | (2006.01) | |
| *G01S 15/02* | (2006.01) | |
| *G01S 7/00* | (2006.01) | |
| *G01S 15/10* | (2006.01) | |
| *G01S 15/87* | (2006.01) | |
| G01S 19/14 | (2010.01) | |
| G01S 19/35 | (2010.01) | |
| G01S 19/51 | (2010.01) | |

(52) U.S. Cl.
CPC .............. *G01S 15/96* (2013.01); *G01S 7/003* (2013.01); *G01S 7/521* (2013.01); *G01S 7/524* (2013.01); *G01S 7/6281* (2013.01); *G01S 15/025* (2013.01); *G01S 15/104* (2013.01); *G01S 15/87* (2013.01); *G01S 15/89* (2013.01); *G01S 15/8902* (2013.01); *G01S 19/14* (2013.01); *G01S 19/35* (2013.01); *G01S 19/51* (2013.01)

(58) Field of Classification Search
CPC .......... G01S 15/96; G01S 7/521; G01S 7/003; G01S 15/104; G01S 15/89; G01S 15/8902; G01S 19/35; G01S 7/524; G01S 15/025; G01S 7/6281; G01S 15/87; G01S 19/14; G01S 19/51
See application file for complete search history.

(56) References Cited

U.S. PATENT DOCUMENTS

| | | |
|---|---|---|
| 5,463,597 A | 10/1995 | Harley |
| 5,495,689 A | 3/1996 | Cassem |
| 5,546,695 A | 8/1996 | Langer |

(Continued)

FOREIGN PATENT DOCUMENTS

CN 203981880 U 12/2014

OTHER PUBLICATIONS

Deeper, Uab; "Deeper Smart Sonar PRO+", <https://buydeeper.com/en/deeper-pro-plus> retrieved Jun. 13, 2016.

*Primary Examiner* — Daniel T Pihulic
(74) *Attorney, Agent, or Firm* — Nelson Mullins Riley & Scarborough LLP (57) ABSTRACT

Various implementations described herein are directed to a castable sonar device that may include a housing. The housing may include a buoyant component and a sonar transducer element configured to produce compressed high intensity radar pulse (CHIRP) sonar. The housing may include a wireless data communication module for communicating with one or more wireless computing devices enabled to display sonar images.

19 Claims, 5 Drawing Sheets

(56) References Cited

U.S. PATENT DOCUMENTS

| | | | |
|---|---|---|---|
| 5,887,376 A | 3/1999 | Currier et al. | |
| 6,122,852 A | 9/2000 | Mechling, IV | |
| 6,693,847 B2 | 2/2004 | Betts | |
| 6,771,562 B2 | 8/2004 | Betts et al. | |
| 7,554,884 B2 | 6/2009 | Park | |
| 9,759,813 B2 * | 9/2017 | Smith | G01S 15/04 |
| 2004/0196180 A1 * | 10/2004 | Hollis | B63C 11/26 |
| | | | 342/357.57 |
| 2013/0215719 A1 * | 8/2013 | Betts | G01S 7/521 |
| | | | 367/88 |
| 2014/0057677 A1 * | 2/2014 | Liubinas | G01S 15/96 |
| | | | 367/87 |
| 2014/0092709 A1 * | 4/2014 | Miller | G01S 7/52003 |
| | | | 367/87 |
| 2014/0269163 A1 * | 9/2014 | Proctor | G01S 15/89 |
| | | | 367/7 |
| 2014/0269192 A1 * | 9/2014 | Proctor | G01S 15/8902 |
| | | | 367/88 |
| 2015/0346339 A1 * | 12/2015 | Zenanko | A01K 91/06 |
| | | | 367/173 |
| 2017/0023676 A1 * | 1/2017 | Laster | G01S 15/96 |

\* cited by examiner

FIG. 5

CASTABLE SONAR DEVICE

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar data collected from a sonar device can provide useful information. For example, sonar data may be used to locate marine life, underwater objects, depth and topography in aquatic environments where visibility is often extremely limited. Improvements in sonar devices that collect this data can provide advantages.

SUMMARY

Described herein are implementations of various technologies for a castable sonar device. In one implementation, the castable sonar device may include a housing. The housing may have a buoyant component. The housing may include a sonar transducer element configured to produce compressed high intensity radar pulse (CHIRP) sonar. The housing may include a wireless data communication module for communicating with one or more wireless computing devices enabled to display sonar images.

Described herein are implementations of various technologies for a castable sonar device. In one implementation, the castable sonar device may include a housing. The housing may have a buoyant component. The housing may include a down-scan transducer. The housing may include a wireless data communication module for communicating with one or more wireless computing devices enabled to display sonar images.

Described herein are implementations of various technologies for a castable sonar device. In one implementation, the castable sonar device may include a housing. The housing may have a buoyant component. The housing may include a down-scan transducer. The housing may include a wireless data communication module for communicating with one or more wireless computing devices enabled to display sonar images.

Described herein are implementations of various technologies for a castable sonar device. In one implementation, the castable sonar device may include a waterproof housing. The waterproof housing may have a buoyant component. The waterproof housing may include a side-scan transducer element. The waterproof housing may include a wireless data communication module for communicating with one or more wireless computing devices enabled to display sonar images.

Described herein are implementations of various technologies for a castable sonar device. In one implementation, the castable sonar device may include a waterproof housing. The waterproof housing may have a buoyant component. The waterproof housing may include a camera and a light. The waterproof housing may include a wireless data communication module for communicating with one or more wireless computing devices enabled to display sonar images.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for a floating wireless sonar device used to identify the presence of fish, various other aquatic life, and underwater structures will now be described in more detail with reference to FIGS. 1-5 in the following paragraphs.

Figure 1:
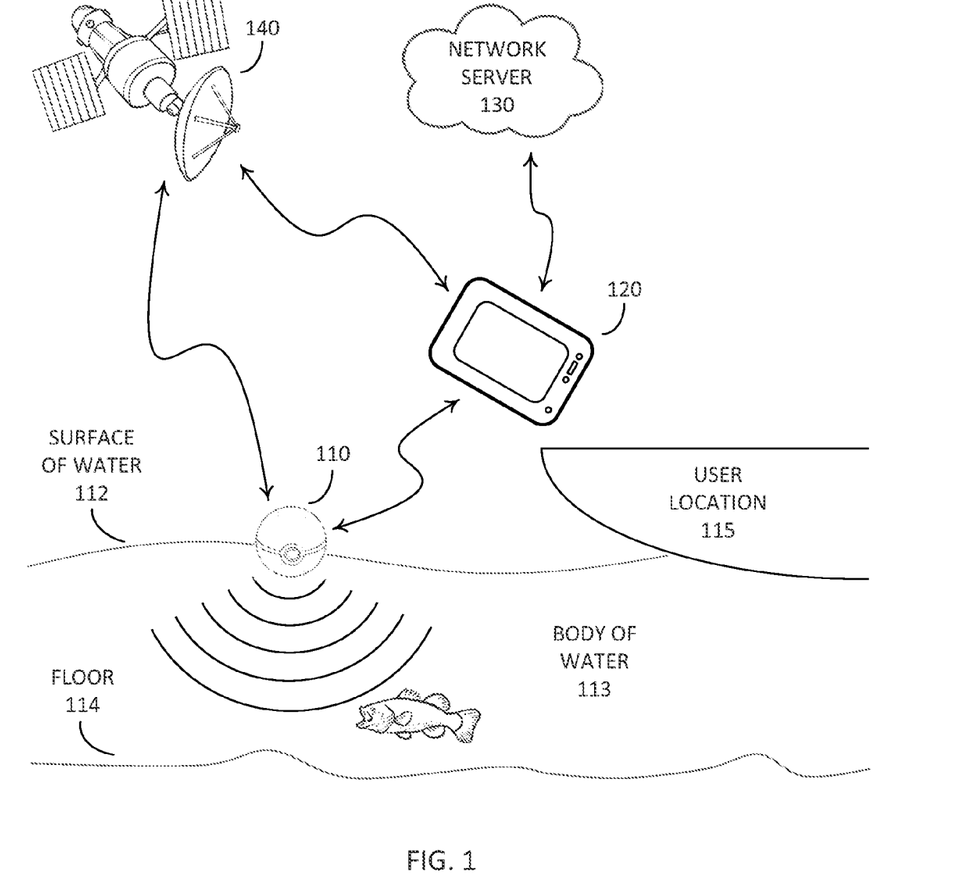
FIG. 1 illustrates a simplified diagrammatical view of fishing using a sonar device in accordance with various implementations described herein.

FIG. 1 illustrates a simplified diagrammatical view of use of a sonar device 110 in accordance with various implementations described herein. As illustrated, a user, e.g., a fisherman, may place the sonar device 110 on the surface 112 of a natural body of water 113. The sonar device 110 may be used for a variety of recreational, commercial, or educational purposes. For instance, the device may be used to give technicians information about an underwater oil rig. The device may also be used to track and observe fish and various other aquatic wildlife for scientific or commercial research. In some implementations, the device may be used to map underwater terrain, structures, or to find objects of interest, such as shipwrecks or plane crashes on the sea floor 114.

After deploying the sonar device 110, a user may withdraw to a user location 115. From the user location 115, the user may monitor the marine environment using a computing device 120. The computing device 120 may be a mobile phone, tablet, or notebook computer. In one scenario, the computing device 120 may be a multi-function display (MFD), and the MFD may have a screen. The screen may be used to depict the data received from the sonar device 110. In one implementation, the computing device 120 may have a split screen where data of different variations are displayed on portions of the screen.

Data to be displayed on the computing device 120 may include that from a plurality of transducer elements. Examples of such transducer elements include a sonar transducer element, e.g., a conical sonar transducer element, that produces a conical beam (or a substantially conical beam) or a down-scan or side-scan transducer element that produces a fan-like or trapezoidal beam (or a substantially trapezoidal beam). For example, data from one type of a sonar transducer, e.g., a conical beam sonar may be displayed on a right portion of the screen and sonar data of another type, e.g., that from a trapezoidal beam of a down-scan and/or side-scan sonar may simultaneously be displayed on a left portion of a screen. In one scenario, the conical sonar transducer element may be substantially disk shaped, and the down-scan transducer elements 240 or side-scan sonar transducer elements 250 may be substantially rectangular or bar shaped.

In one implementation, the transducer elements may further be capable of creating CHIRP (Compressed High Intensity Radar Pulse) sonar data. In other implementations, the sonar device 110 may contain camera elements within its outer housing. Certain functions, such as the side-scan sonar or camera may benefit from a moving point of view. Therefore, in certain implementations, a waterproof motor structure may be included as a component of the sonar device 110, enabling the sonar device 110 to be self-propelled. The CHIRP-sonar capability, camera, and motor included in certain implementations will be discussed in greater detail below, with reference to FIG. 2.

When implemented in a fishing context, the user may deploy the sonar device 110 in a variety of circumstances. He may position the device near an area he believes may have a high concentration of fish. For example, fish are known to gather around structures or objects found on the sea floor 114, such as reefs, channels, ditches, bumps, edges, bridges, boat docks, rock piles, standing trees, or tree branches. A user may use traditional wired sonar devices (not shown) to search from a marine vessel while the marine vessel is in motion. The user may then employ the sonar device 110 while the marine vessel is relatively stationary. In some implementations, a user may deploy the sonar device 110 while the marine vessel is in motion (e.g., while towing the sonar device 110).

The device may be deployed in a diverse set of aquatic environments 113. For instance, the device may be used in a typical aquatic environment, or alternatively in an environment where the surface 112 of the water is substantially frozen. In the case of a frozen surface, a fisherman or other user may cut a hole or otherwise clear ice away in order to place the device onto the surface of the water. It is contemplated that the device may be used in aquatic environments that are relatively still and contained where there is little movement or current on the surface of the water. In other implementations, the device may be used in areas where there is substantial movement or current on the water, such as rivers, streams or canals. It is contemplated that the device may be used in fresh or saltwater environments, and in large bodies of water such as oceans, seas or lakes, but also smaller bodies of water such as ponds or wetlands.

The sonar device may be portable and castable, thus the user of a sonar device 110 may interact with the device from a variety of user locations 115. For instance, a user may deploy the device and interact with it from a relatively close location specially adapted for a specific marine use, and located a short distance (e.g., less than a hundred meters) from the sonar device 110. An example of such a user location may be a nearby marine vessel, as pictured in FIG. 1. Other short distance locations may be a nearby shoreline or from an over-water structure such as a bridge or pier. In some implementations, the user may interact with the device from a more remote location not in the immediate vicinity of where the sonar device 110 may be deployed (e.g., greater than a hundred meters). The remote location may be a marine vessel located a relatively far distance away from the device, a location on land a greater distance away from the device, or even from an aerial location, such as from a manned aerial craft or alternatively, a drone or satellite.

Multiple computing devices 120 may be used simultaneously to interact with the sonar device 110. One computing device 120 may be used to display data from one type of sonar transducer (e.g. that from a down-scan sonar transducer), while another may be used to employed to display data from another type of sonar transducer (e.g., that from a side-scan sonar transducer). Yet another computing device 120 may be dedicated to the display of CHIRP sonar data. Additional computing devices may be used to simultaneously display various data received by the sonar device 110 such as that received by the camera included in some implementations of the sonar device 110.

It is additionally contemplated that more than one sonar device 110 may be deployed at one time. In that scenario, the data from the multiple sonar devices 110 may be simultaneously displayed on one computing device 120. In another scenario, a separate computing device 120 may be wirelessly paired with each respective wireless sonar device 110. In yet another implementation, one computing device 120 may be employed to display data from one sonar device 110 while another is employed to display data from multiple sonar devices 110. The multiple sonar devices 110 may be configured to work in concert with one another. For example, multiple wireless floating sonar devices 110 may be configured to gather data from different sonar transducers, to create a split-screen view as discussed above. Alternatively, multiple sonar devices 110 may be configured to gather data using similar transducers, and that data may be interlaced to display a single view that includes greater detail or a view having a wider perspective than that available using a single sonar device 110.

The sonar device 110 may be encapsulated by a waterproof housing, wherein the material of waterproof housing may be impervious to freshwater and/or saltwater. The waterproof housing may be composed of an upper and lower portion. The components may be molded plastic or some other suitable waterproof material. The components may be coupled using a threading, screws or other fasteners. Sealing gaskets may be employed at the connections to provide a waterproof housing structure. The waterproof housing may provide protection for the plurality of transducer elements that may be encapsulated in the waterproof housing. The waterproof housing may further have connections or insulated wires that pass through the waterproof housing to electrically connect the components within the waterproof housing to the exterior of the housing. For example, for purposes of charging a battery or for a wired data connection.

It is also contemplated that the sonar device 110 may include an outer housing that is not waterproof. Thus, electrical components of the sonar device 110 may be individually waterproof or may be housed in several smaller waterproof modules that are distributed throughout the outer housing. Accordingly, the outer housing may not protect electronic components from water. Instead, the outer housing defines an outer shape of the device 110, mechanically interacts with the waterproof electrical components, and mechanically interconnects the waterproof electrical components.

In one implementation, the sonar device 110 may be castable, whereby a user may cast or pitch the sonar device 110 into the water. In one scenario, the waterproof housing may include a fixture, whereby the fixture allows the sonar device 110 to be cast, towed, suspended, aligned or retrieved by a user. For example, the waterproof housing may be attached using the fixture to a fishing line, cord or the like.

The sonar device 110 may include multiple fixtures. For example, there may be a fixture located substantially on top of the waterproof housing, whereby the fixture allows the sonar device 110 to be suspended from a fishing line. There may be a fixture located substantially on the peripheral of the waterproof housing, whereby the fixture allows the sonar device 110 to be drawn through the water while trolling. In one scenario, the sonar device 110 may be drawn through the water by winding in the fishing line, or by towing the sonar device 110 behind a moving watercraft.

The outer housing may be inherently buoyant. In yet another scenario, the outer housing may not be inherently buoyant, but may include a buoyant element within the outer housing, or a buoyant attachment to the outside of the outer housing. Further, the sonar device 110 may be ballasted such that the sonar device 110 is partially or fully submerged while ensuring that objects on the surface of the water 112 do not hinder operation of the sonar transducer elements. Referring to FIG. 1, the sonar device 110 may be floating on a surface of the water 112 untethered. A user may recover an untethered sonar device 110 by latching onto one or more of the fixtures using a boat hook or the like.

The sonar device 110 may further include a GPS module or GPS transceiver within its outer housing. The GPS module may receive GPS data wirelessly from a GPS satellite via a GPS antenna. The GPS antenna may be encapsulated within the outer housing of the sonar device 110 or embedded within its skin.

Figure 2:
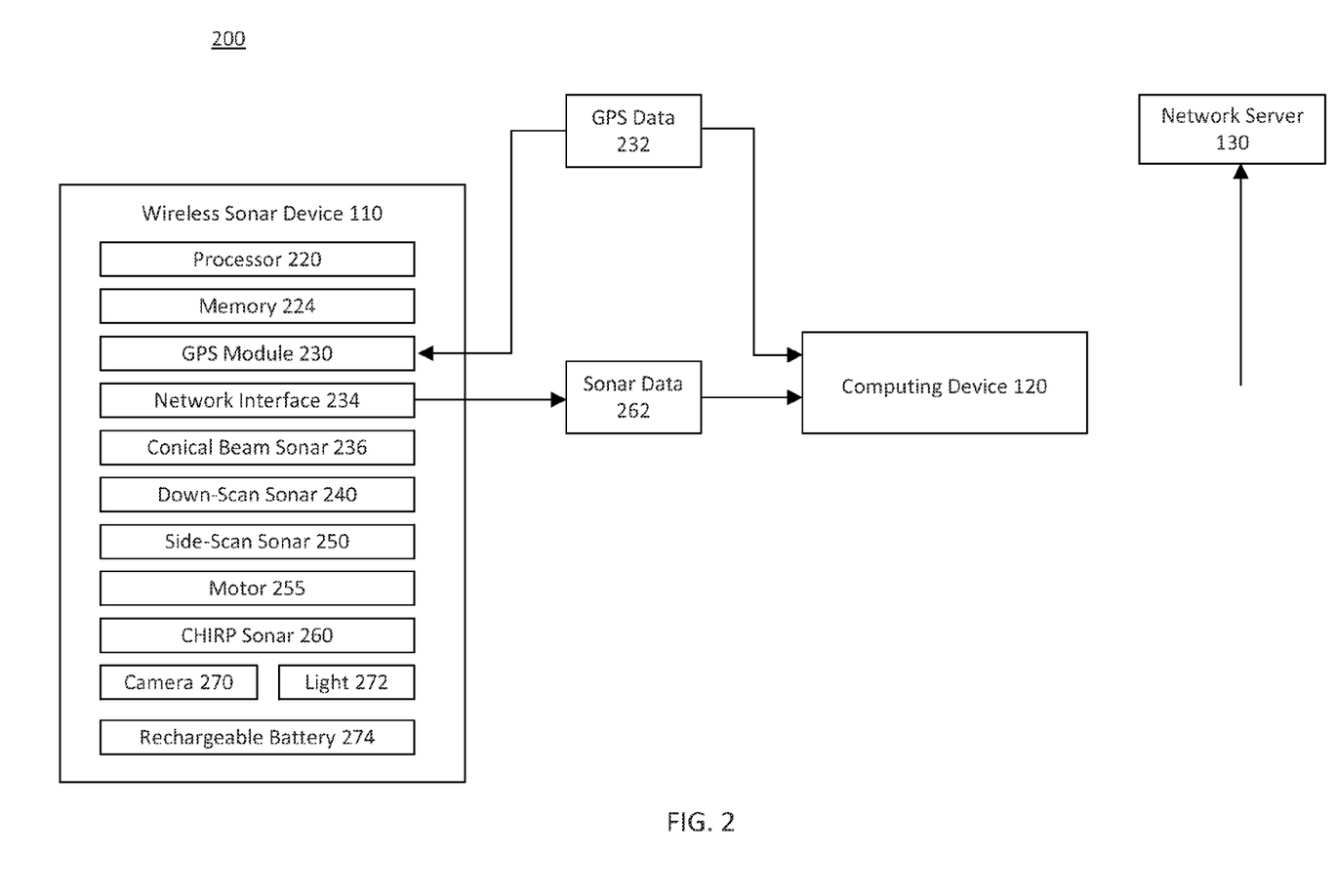
FIG. 2 illustrates a block diagram of a sonar system in accordance with various implementations described herein.

FIG. 2 illustrates a block diagram of a sonar system 200 in accordance with various implementations described herein. The sonar system 200 may include a number of different modules or components, each of which may comprise any device or means embodied in either hardware, software, or a combination of hardware and software configured to perform one or more corresponding functions. The sonar system 200 may include the sonar device 110 and a computing device 120. In one implementation, the sonar device 110 may include various computing, processing, and storage components, such as at least one processor 220 and one memory device 224. The sonar device 110 may additionally include a GPS module 230 and network interface 234. The network interface 234 may be linked via a wireless network to the computing device 120 and further linked via a wired or wireless network to a network server 130. As discussed above, the sonar device 110 may include one or more sonar transducer elements, such as a conical beam sonar transducer 236, a down-scan sonar transducer 240, and/or a side-scan sonar transducer 250. In some implementations, the sonar device 110 may include a propulsion element such as a motor 255. Additionally, any or all of the one or more transducer elements may be CHIRP-enabled. Alternatively, the sonar device 110 may include a separate dedicated CHIRP-enabled sonar transducer 260. In some implementations, the sonar device 110 may include a camera 270, camera light 272, as well as a battery 274, which may be rechargeable.

The memory 224 may include instructions that cause the processor 220 to execute all of the various functions of the sonar device 110. In some implementations, the memory 224 may include instructions that cause the processor to transmit sonar beams and receive sonar data 262 from one or more sonar transducer elements. For example, the memory 224 may include instructions that cause the processor 220 to direct the conical beam sonar transducer element 236 to produce a conical beam. Furthermore, the down-scan sonar transducer element 240 may receive instructions to produce a trapezoidal beam oriented in the downward position, and/or the side-scan sonar element 250 may be directed to produce a trapezoidal beam oriented in a sideways direction. The memory 224 may further include instructions that cause the processor 220 to initiate one or more of the transducer elements that are CHIRP-enabled to produce an acoustic burst that sweeps across a range of frequencies. The memory 224 may also direct the processor to receive and process sensor data generated by the various transducers. In addition, the memory 224 may include instructions that cause the processor 220 to filter, process, or record the sonar data 262, which may be received while the sonar device 110 is deployed in the body of water 113.

As mentioned above, the outer housing of the sonar device 110 may further include a global positioning system (GPS) transceiver or module 230. The GPS module 230 may receive GPS data 232 from a GPS satellite 140, which may include location information, latitude and longitude, and time information. The GPS location of the sonar device 110 may be wirelessly transmitted to the computing device 120 at the user's location 115. The GPS module 230 may enable GPS positioning information, and/or time stamps, to be assigned to the sonar data 262 at a given location, or during trolling. The GPS positioning information may be assigned to the sonar data 262 by the sonar device 110 before it is wirelessly transmitted, or it may be assigned after it is received at the user location 115 by the computing device 120.

In a further implementation, the sonar data 262 and corresponding GPS positioning information, hereafter 'sonar data', may be superimposed on a bathymetric chart or map displayed on the screen of the MFD. In one scenario, GPS positioning information may be used to create a sonar map of a marine environment. In a further scenario, a user may assign a waypoint, fishing notes etc., to a specific location on the bathymetric chart, topographic map or sonar map. In yet another scenario, the sonar data 262 may be logged to a storage device, transmitted, received, shared, synchronized with historical sonar data 262, or combination thereof.

In yet another implementation, a user may use knowledge of the GPS location of a sonar device 110 for retrieving the sonar device 110. For example, in some cases, the sonar device 110 may be floating freely on the surface of a body of water, and not be directly tethered to the user's location 115. As such, it may be difficult to locate the sonar device 110 in adverse conditions and/or at night. The user may enter the GPS position of the sonar device 110 into any device that can navigate to a GPS location and direct him to the sonar device 110.

As discussed above, the sonar device 110 may additionally contain sonar transducer elements capable of creating CHIRP sonar data. The frequency within a sonar acoustic burst may be changed through the duration of the transmission (i.e. swept from one frequency to another) using various CHIRP (Compressed High Intensity Radar Pulse) techniques. For example, at the start of the transmission the sonar may operate at 100 KHz, and at the end, it may have reached 150 KHz—the difference between the starting and ending frequency is known as the bandwidth of the transmission, and typically the center frequency of the sweep is used to designate the pulse. Thus, the noted example would be designated as a 125 KHz pulse. By constantly changing its frequency over time, the chirped transmission may have a unique acoustic signature, and therefore if two pulses overlap (when multiple targets are closer together than the range resolution), the known frequency-versus-time information may be used to discriminate between the targets. Using high-speed digital-signal-processing (DSP) techniques, the sonar receiver may include a pattern-matching circuit that looks for the echo resulting from the transmitted CHIRP pulse, and the sonar receiver can produce a sharp spike when a good match is found. In contrast, a monotonic sonar pulse would produce an output having the same duration as the transmit pulse. With a chirped sonar, when two acoustic echoes overlap, the CHIRP pulses do not merge into a single acoustic return because their frequency is different from each other at the overlapping points, and the sonar is able to resolve and display the two targets. Consequently, longer transmissions can be used to detect targets farther away without a loss in resolution. Furthermore, CHIRP signal processing techniques may provide improvements in background noise rejection.

In one implementation, the conical sonar transducer element 236 may operate at a different frequency than that of the down-scan sonar transducer element 240. For example, the frequency of the conical beam may be lower than that of the trapezoidal beam. In a further implementation the conical sonar transducer element 236 may operate at either 83 kHz (or thereabout) or 200 kHz (or thereabout), whereas the down-scan sonar transducer element 240 may operate at either 455 kHz (or thereabout) or 800 kHz (or thereabout).

The size of the wave front created by the transducer element acoustic beam may affect the resolution of the return echo, and therefore the quality of the displayed image of objects of interest in the marine environment. For example, a wide and/or low frequency acoustic beam may result in diffused echo returns, which may be more suited to indicate the presence of fish in a wide area beneath the sonar device 110, whereas the echo returns from a narrower and/or higher frequency acoustic beam may provide additional definition. This additional definition may provide a picture like representative of an object of interest in the marine environment. A narrower acoustic beam may therefore be more useful for identifying objects of interest in the marine environment.

The various sonar transducer elements of the sonar device 110 may therefore have different coverage patterns, resolutions or functions. In one scenario, a conical beam may have a larger coverage area, but lower resolution than the trapezoidal beam of the down-scan sonar transducer element. A fisherman may use the conical beam to detect the presence or fish, whereas, he may use the trapezoidal beam to identify objects of interest within the marine environment, e.g., marine vegetation, reefs, sandbars, trees, man-made structures, wrecks or underwater debris. In one scenario, the user may use the higher resolution trapezoidal beam of the down-scan sonar to determine whether he has position himself over an object of interest in the marine environment with which fish may be associated with, such as a wreck.

In some implementations, certain sonar images may be enhanced by continuous (or substantially continuous) linear or rotational movement of the sonar transducers. As discussed above, the sonar device 110 may therefore include self-propulsion elements to generate this movement, such as a motor 255. The motor may include a rotor and stator assembly. The stator may be connected to a motor-controlling circuit board. The stator may be waterproofed using a variety of known methods, such as being encased in a protective outer layer made of a waterproof material such as injection molded plastic. In certain implementations, the motor 255 will be connected via a wired connection to a motor drive controller. The motor drive controller may be encased in a waterproof controller housing and in some implementations may include waterproof external connectors and/or a waterproof power source junction box.

The sonar device 110 may have status indicators. The status indicators may be situated on the outside of its outer housing. Alternatively, the status information may be wirelessly transmitted to the computing device 120. Status information may pertain to many health parameters of the sonar device 110.

The sonar device 110 and/or the computing device 120 may process the sonar data 262. The sonar data 262 may be processed to enhance the detection and/or identification of an object of interest within the marine environment. For example, marine vegetation, reefs, fishes, lures, sandbars, trees, man-made structures, wrecks or underwater debris. Processing of the sonar data 262 may also include filtering the sonar data 262 to remove interference or noise pollution that may be attributed to other sonar sources, e.g., watercrafts propellers and engines, or other sonar devices 110. Further, as disclosed herein, processing may also include assigning GPS positions and environmental sensor data to the sonar data 262 to create a sonar map of a body of water. Processing may further include stitching, combing, and/or joining multiple sonar data 262 or log files together to create one or more sonar maps. In one scenario, these log files may have been recorded by the user from a plurality of sonar devices 110.

The sonar data 262 may be processed to identify an object of interest, such as a fish or wreck, within the sonar data 262. For instance, the computing device 120 may notify the user to the presence of fish by an alarm. The user may define an alert zone within the boundaries of a sonar beam, whereby an alarm is only generated if the processed sonar data 262 indicates that a fish is within the defined alert zone.

The sonar data 262 may be processed such that a depth may be associated with objects of interest within the marine environment. Knowing the depth of one or more game fishes, bait fishes and/or lures 140 may further assist the fisherman. The fisherman may use this information to position lures 140 at the same depth as fish identified in the sonar data 262.

As mentioned above, the sonar device 110 may include a down-scan sonar transducer element 240 or side-scan sonar transducer element 250, which may have substantially trapezoidal beams. In one scenario, the trapezoidal beams may be broad in width, but narrow in thickness. A trapezoidal beam of a first sonar device 110 may be positioned to reduce interference from one or more additional sonar devices 110 that may be in the vicinity. Furthermore, a first trapezoidal beam of a sonar device 110 may be positioned to reduce interference from a second trapezoidal beam of the sonar device 110. For example, a first trapezoidal beam of the sonar device 110 may be orientated such that the first trapezoidal beam is substantially parallel to a second trapezoidal beam of one the sonar device 110, which may otherwise interfere with each other.

In one implementation, the sonar transducer elements of the sonar device 110 may operate at multiple frequencies. Where implementations include CHIRP-enabled transducers 260, the sonar device 110 may operate at multiple ranges of frequencies. In a further implementation, the sonar transducer elements of a sonar device 110 may be programed to operate at different frequencies or frequency channels. This feature may be used to reduce interference from other noise sources, including additional sonar devices 110, which may be in the vicinity. For example, a first sonar device 110 may be configured to operate on a first frequency channel, while a second wireless transducer device 120 may be configured to operate on a second and different frequency channel. The spacing of the different frequency channels exists to avoid interference. In one scenario, the different frequency channels may be preprogrammed into the sonar device 110 by a manufacture. In another scenario, the different frequency channels may be directly programed into each sonar device 110 by a user. For example, the user may program a frequency channel directly into the sonar device 110 using a user interface, which may be located on the sonar device 110, and/or on the computing device 120. As such, the user may be able to change the operating frequency of the various transducer elements encapsulated within the outer housing of a sonar device 110 in real time wirelessly. In one scenario, this may done in response to an analysis of local noise sources. For example, the sonar device 110 may passively listen for noise sources on each of its frequency channels to determine the ambient noise. The user may then determine a frequency channel based on this analysis.

In another implementation, the sonar transducer elements may be configured to operate on different time slots. This feature may be used to reduce interference from other noise sources, including additional sonar devices 110, which may be in the vicinity. For example, a first sonar device 110 may be programmed to operate on a first time slot, while a second sonar device 110 may be programmed to operate on a second and different time slot. The spacing of the time slots is created to minimize interference. In another implementation, various sonar devices 110 may be programmed to ping their transducer elements sequentially and/or randomly (pseudo-randomly) with respect to each other. This feature may also reduce interference with other sonar devices 110 and/or noise sources in the vicinity.

As discussed above, in some implementations, the sonar device 110 may include a camera 270 and camera light 272. Though visibility may be limited at times, light data, images, and video obtained by underwater cameras may still prove advantageous. For example, a digital video camera and recorder (DVC/R) may be used to visually monitor underwater conditions, surveil bait and surrounding fish, or to record the actions of the user, such as the capture of a fish by a fisherman. Thus, in some implementations, the sonar device may include a camera as well as a light directed in the view of the camera. The outer housing of the sonar device may include a transparent part to allow light and images to be received by the camera lens. In order to protect the camera from water and dust, the DVC/R unit may be contained within a separate water-resistant housing, or alternatively protected by the outer housing of the sonar device 110. The camera may include an image sensor such as a charge-coupled device (CCD) and an associated camera lens. The camera 270 may also include a dedicated microprocessor for controlling the functions of the camera 270 and light 272. In some implementations, image and video data acquired by the camera 270 may be stored in a dedicated camera storage module that is non-volatile memory. In other implementations, the image and video data may be transmitted to the computing device 120 via the wireless network interface 234 of the sonar device 110. As described above, the lens of the image sensor may be positioned adjacent to a transparent window in the outer housing to provide a field of view. The transparent window may include an optical filter or the like. The sonar device 110 may also include a battery. The battery may be a rechargeable. The rechargeable battery 277 may be encapsulated within the outer housing of the sonar device 110, and a battery level may be indicated on the outer housing and/or transmitted to the computing device 120. In one scenario, the rechargeable battery 277 may be charged via a suitable connector, or inductively, so as to retain the waterproof integrity of any outer housing seal when charging. The outer housing may further include a communication module or wireless network interface 234. The wireless network interface 234 may allow the sonar device 110 to wirelessly communicate with other wireless devices or computing devices 120, such as a computer, laptop, smart phone, tablet, marine electronics device or multi-function display (MFD), or to a network server 130. The wireless communication may be via Bluetooth, Wi-Fi™ or cellular. It should be understood that other computing devices 120, and communication methods, known to a person of ordinary skill in the art may be used herein.

Status information for the transducer elements, GPS module 230, environmental sensors 275, wireless connection etc. may also be wirelessly transmitted to a computing device 120.

The processor 220 may be any device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 220 as described herein. In this regard, the processor 220 may be configured to analyze electrical signals communicated thereto by the one or more sonar transceivers to provide sonar data 262 indicative of the size, location, shape, etc. of objects detected by the sonar system 200. For example, the processor 220 may be configured to receive sonar data 262 and process the sonar data 262 to generate sonar image data for display to a user (e.g., on display of the computing device 120).

Figure 3:
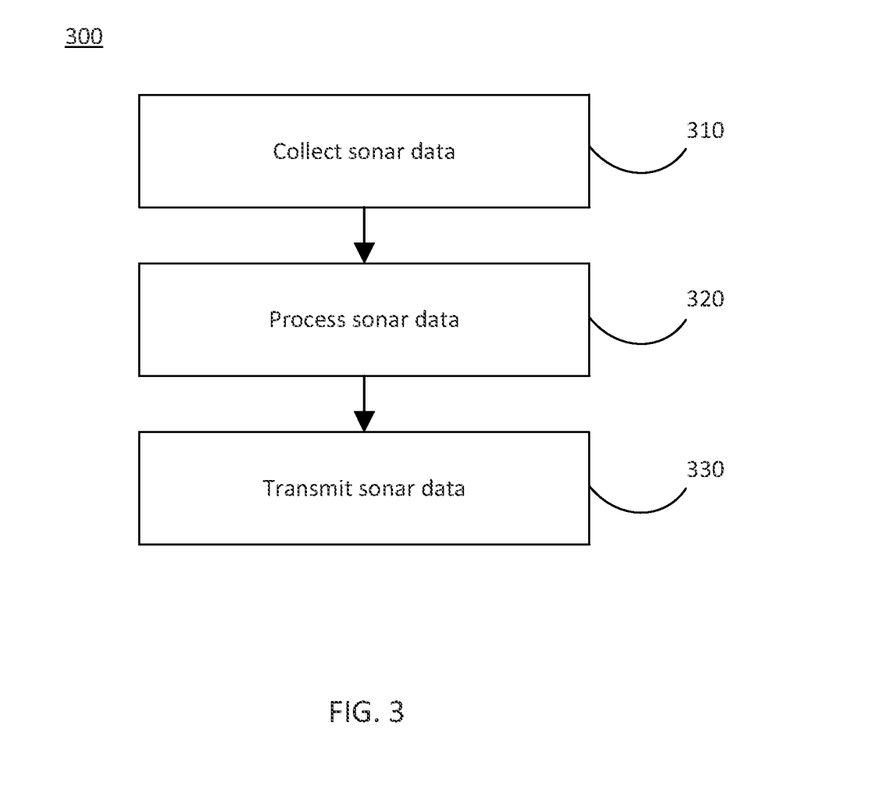
FIG. 3 illustrate a flow diagram of a method for acquiring, processing, and transmitting sonar data in accordance with various implementations described herein.

The processor 220 may include a processor, a processing element, a coprocessor, a controller or various other processing means or devices including integrated circuits such as, for example, an ASIC, FPGA or hardware accelerator, that is configured to execute various programmed operations or instructions stored in the memory device 224. The processor 220 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming sonar data 262 or screen images for future playback or transfer, or alter images with additional processing to implement zoom or lateral movement, or to correlate data, such as fish or bottom features to a GPS position or temperature. The processor 220 may execute commercially available software for controlling a transceiver and/or transducer assembly and for processing data received therefrom FIG. 3 illustrates a flow diagram of a method 300 for collecting, processing and transmitting sonar data 262 in accordance with various implementations described herein. In one scenario, method 300 may be performed by the sonar device 110. Some steps of the method 300 may be performed by computing system or computing device 120, including a marine electronics device and the like. The one or more sonar devices 110 may be in wireless communication with one or more computing devices 120.

In one implementation, method 300 may be performed by one or more computer applications, where the computer applications may implement one or more of the steps described below. It should be understood that while method 300 indicates a particular order of execution of operations, in some implementations certain portions of the operations may be executed in a different order, and on different systems. Further, in some implementations, additional operations or steps may be added to method 300. Likewise, some operations or steps may be omitted.

At block 310, sonar data 262 may be collected by a sonar device 110. The collection of the sonar data 262 may be caused by the execution of instructions from the sonar device memory 224 and received by the sonar device processor 220. The collection of sonar data 262 may be initiated by a selection by the user communicated via the computing device and received at the sonar device 110 via the communication model 234. Alternatively, the collection of sonar data may be an automatic process initiated upon powering on the sonar device 110. In one implementation, the sonar device 110 may have a plurality of sonar transducer elements, e.g., a sonar transducer element 236 which produces a conical beam, a down-scan sonar transducer element 240, which produces a trapezoidal beam directed in a downward direction, and a side-scan sonar transducer element 250 which produces a trapezoidal beam directed in a sideways direction. Further, data may be received from one or more CHIRP sonar transducer elements 260 capable of producing CHIRP sonar data. In one scenario, sonar data 262 may be received from more than one transducer element simultaneously. In another implementation, the data collected may further include GPS data 232, time stamps, and camera data, as described above.

At block 320, the sonar data 262 may be processed by the sonar device processor 220 to accurately detect and identify objects of interest in the marine environment. The conical beam sonar 236 may be used for the detection of fish. The trapezoidal beam of the down-scan sonar 240 and side-scan sonar 250 may be used for the identification of objects of interest within the marine environment, such as trees, and may have a higher sonar resolution than the data generated using the conical beam sonar 236. Alternatively, some of this processing may be completed by the computing device 120. The data from the CHIRP enabled sonar transducer 260 may be processed by the CHIRP-enabled sonar device processor 220.

In one implementation, the sonar data 262 may be filtered to reduce interference or noise pollution from other noise sources. The sonar data 262 may also be processed to enhance the detection of fish. Likewise, the sonar data 262 may be processed such that a fisherman may be notified of the presence of fish or an object of interest in the marine environment by generation of an alarm.

The sonar data 262 may also be processed to enhance the identification of objects of interest within the marine environment. For instance, the sonar data 262 may be processed such that a depth can be assigned to the object of interest. Depth increments may be displayed on a screen with the corresponding processed sonar data 262.

In one implementation, the sonar data 262 may be processed so that a GPS location and/or time stamp may be assigned to sonar data 262 as it is received. GPS location may be assigned to the sonar data 262 while the sonar device 110 is being trolled through the water or at a given location. GPS positioning information may be used to superimpose the sonar data 262 onto a bathymetric chart or topographic map, thereby creating a sonar map of a marine environment. The GPS data files may have been obtained from a plurality of sonar devices 110 as they have been casted and/or trolled. The processing may also include synchronizing the sonar data 262 with sonar data 262 obtained from other sources, such as historical data logs, which may have been previously recorded by the user and/or obtained from other sources.

The sonar data 262 may further be processed to make it easier for the user to interpret, and distinguish between objects of interest in the marine environment. For example, various colors, symbols and/or icons may be assigned to different objects of interest identified in the marine environment. As another example, processing may include using interpolation, whereby interpolation of the sonar data 262 (point cloud) may enhance the contours and/or boundaries of an object of interest in the marine environment, thereby making it easier for a user to identify the object. The bottom topography depth contour of a lake, riverbed or seabed may be interpolated and/or shaded to make it easier for a user to visualize.

At block 330, the processed sonar data 262 may be transmitted to a computing device 120 to be displayed or further processed. In one scenario, the sonar device 110 may transmit the multiple types of sonar data 262 to one computing device 120. In another scenario, the sonar device 110 may transmit the sonar data 262 to multiple computing devices 120. For example, the sonar device 110 may transmit the data from transducers operating in monotonic frequency to one computing device 120, and data from a CHIRP-enabled sonar transducer 260 to a second computing device 120.

The sonar device 110 may also transmit information in addition to sonar data. For example, navigational information may also be transmitted to the computing device 120. In one implementation, the user may use navigation information to locate and retire a sonar device 110 that may transmit its location as part of the sonar data 262. In one scenario, the user may use this feature to navigate to a waypoint that may be associated with a desirable fishing location that has been previously saved by the user. The sonar device 110 may also transmit data including one or more alarms when an object of interest is detected and/or identified within the sonar data 262.

Figure 4:
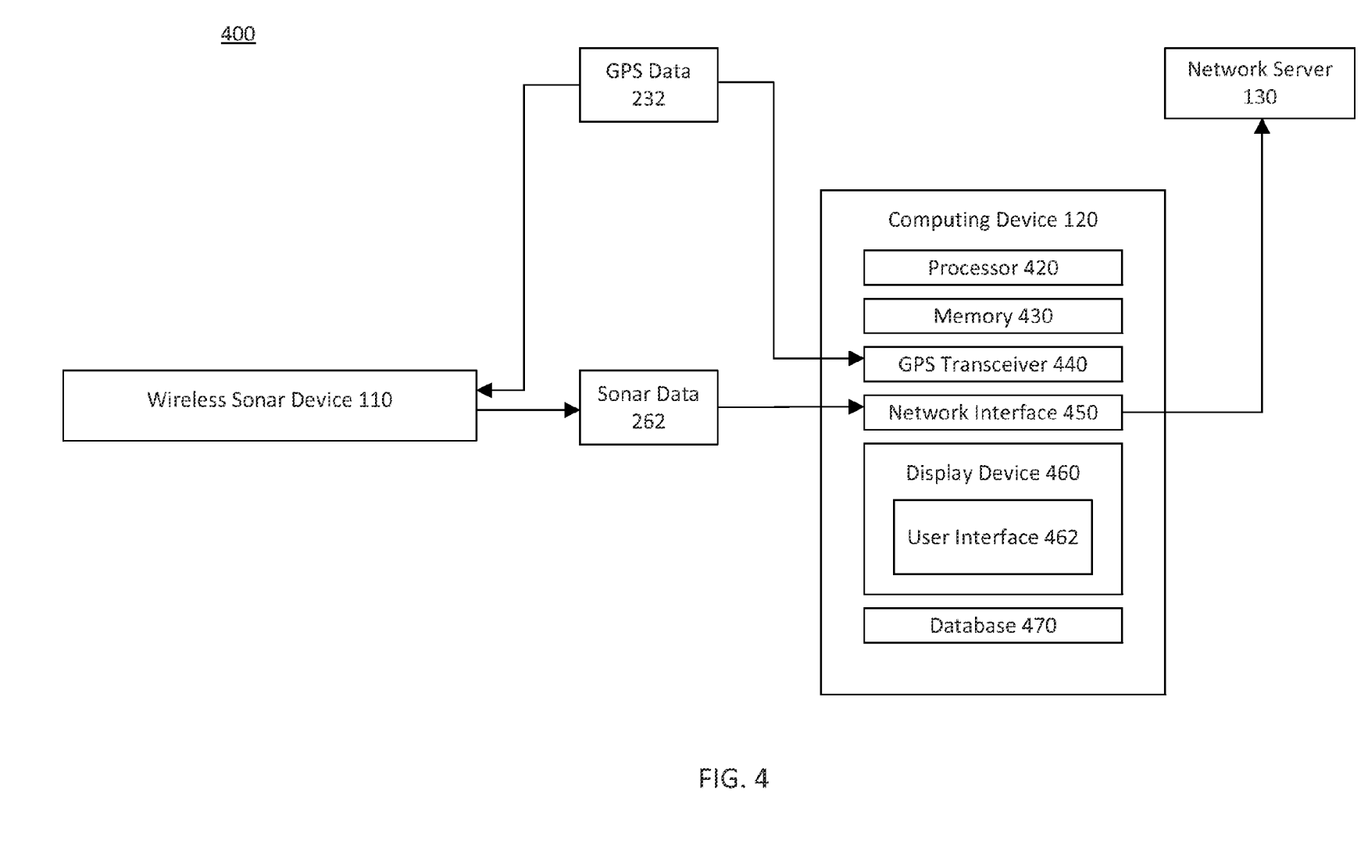
FIG. 4 illustrates a block diagram of the sonar system in accordance with various implementations described herein.

FIG. 4 illustrates a block diagram of the sonar system 400 in accordance with various implementations described herein. The sonar system 400 may include a number of different modules or components, each of which may comprise any device or means embodied in either hardware, software, or a combination of hardware and software configured to perform one or more corresponding functions. As described above with reference to FIG. 2, the sonar system 400 may include the sonar device 110 and a computing device 120. The sonar system 400 in FIG. 4 is the same sonar system 200 in FIG. 2, except that the computing device 120 is illustrated in more detail.

The computing device 120 may be a marine electronics device, MFD, smart phone, computer, laptop, tablet, etc. The computing device 120 may include a wireless network interface 450 for receiving the transmitted sonar data 262. In one implementation, the network interface 250 may also include a mobile wireless internet interface, which may allow the user of the computing device 120 to access a network server 254 on the internet. The computing device 120 may include various computing, processing, and storage components, such as at least one processor 420 and memory 235.

The memory 235 may include instructions that cause the processor 420 to receive and process the sonar data 262. In one implementation, the memory 235 may include instructions that allow the processor 420 to receive and process sonar data 262 from a CHIRP-enabled sonar transducer 260 of a sonar device 110. In a further implementation, the memory 235 may include instructions that cause the processor to receive and display camera data. The processor 420 may store, record and/or log the sonar data 262 in one or more databases 470. The computing device 120 may be configured to store and record multiple data logs. In another implementation, the computing device 120 may determine one or more sonar maps of a body of water using data log files. For instance, the computing device 120 may be configured to determine one or more sonar maps by stitching, combing, and/or joining multiple data log files together.

The computing device 120 may be configured to display data and/or various images, maps associated with the sonar data 262 on a display 460. The display 460 may further include a user interface 462. A user may enter commands and information into the computing device 120 using a user interface 462, through input devices such as touch screens. The user interface 462 may allow the user to adjust settings and/or configure one or more sonar devices 110 in real time. Further, the computing device 120 may be configured to upload the sonar data 262 and/or sonar log files to a network server 254 via the network interface 450. The network server 450 may be a cloud server or other network server. Further, in some instances the computing device 120 may be configured to associate GPS positioning data to the data, data logs, images, maps etc., at any time, including prior to uploading to the network server 450. The GPS position information may be obtained from a GPS transceiver 440 which may be encapsulated within the outer housing of the sonar device 110, and/or from a GPS transceiver 440 located within the computing device 120.

The computing device 120 may be configured as a special purpose machine for interfacing with a sonar device 110. In one implementation, the computing device 120 is configured to interface with and send control signals to the motor 255. In another implementation, the computing device 120 is configured to interface with and control the camera 270 and camera light 272. In further implementations, the computing device is specially configured to interface with and control the CHIRP sonar 260 of the sonar device 110. Further, the computing device 120 may include various standard elements and/or components, including the at least one processor 420, the memory 430 (e.g., non-transitory computer-readable storage medium), at least one database 470, power, peripherals, and various other computing components that may not be specifically shown in FIG. 2. Further, the computing device 120 may include the display device 460 (e.g., a monitor or other computer display) that may be used to provide a user interface 462, including a graphical user interface (GUI). In FIG. 2, the display 460 is shown as an incorporated part of the computing device 120; however, the display 460 may be implemented as a separate component. Further, the user interface 462 may be used to receive one or more preferences from a user of the display device 460 for managing or utilizing the sonar system 400, including interfacing with the sonar device 110 and the two or more sonar transducer elements. As such, a user may configure the desired behavior of the sensor system 400 and/or the two or more transducer elements via user-selected preferences using the user interface 462 associated with the display device 460.

Various elements and/or components of the system 400 that may be useful for the purpose of implementing the system 400 may be added, included, and/or interchanged, in manner as described herein. For example, the computing device 120 may have built in functionality, and capabilities that may further assist the user while fishing. For example, the computing device 120 may have mobile wireless internet access. Mobile wireless internet access may allow a user to access weather forecasts, radar maps, tidal information, moon phases, sunrise and sunset calendars and the like.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 5:
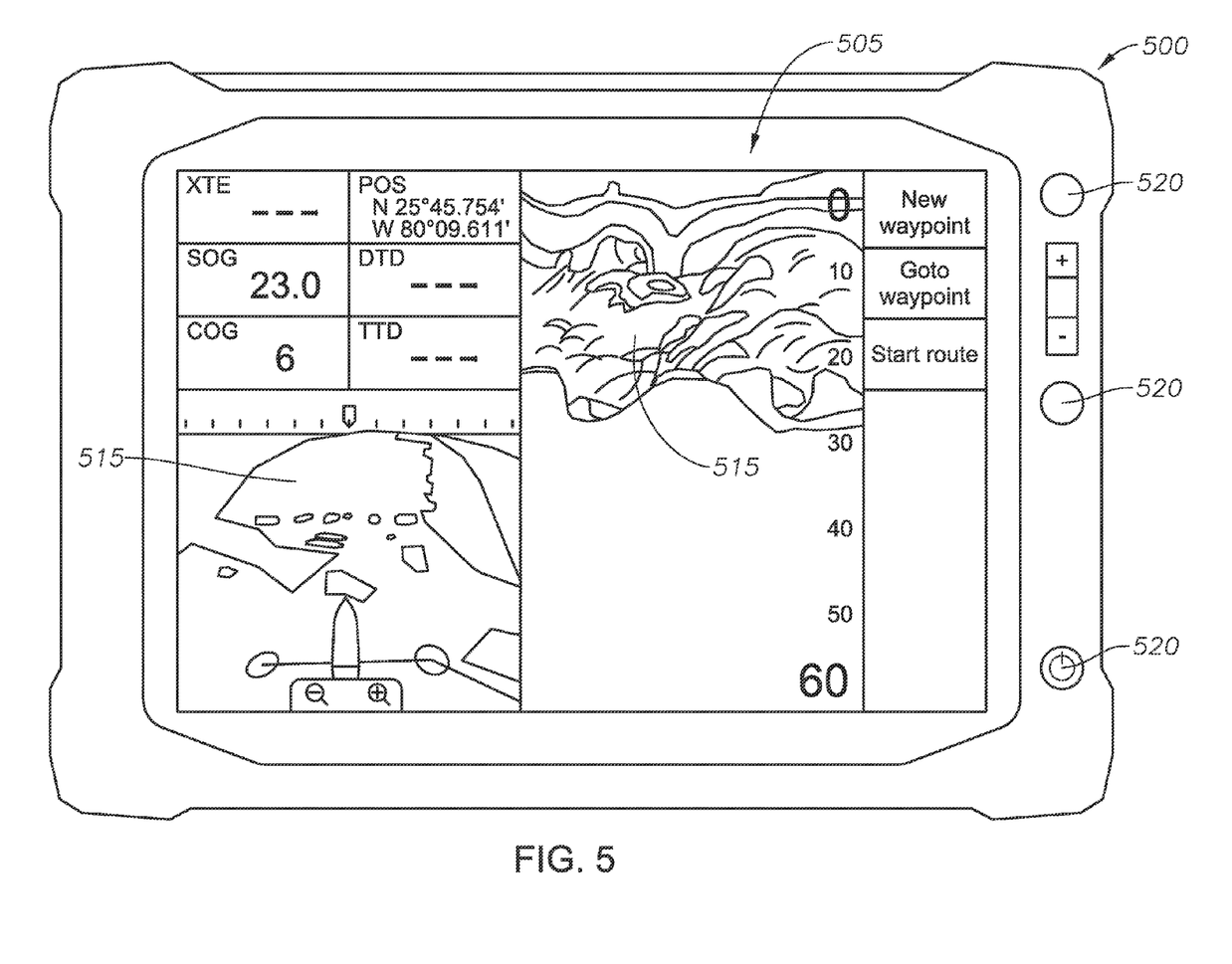
FIG. 5 illustrates a schematic of a marine electronics device in accordance with various implementations described herein.

FIG. 5 illustrates a schematic of a marine electronics device 500 in accordance with implementations of various techniques described herein. The marine electronics device 500 includes a screen 505. In certain implementations, the screen 505 may be sensitive to touching by a finger. In other instances, the screen 505 may be sensitive to the body heat from a finger, a stylus, or responsive to a mouse. The marine electronics device 500 may be attached to a National Marine Electronics Association (NMEA) bus or network. The marine electronics device 500 may send or receive data to or from another device attached to the NMEA 2000 bus. For example, the marine electronics device 500 may transmit commands and receive data from a motor or a sensor using an NMEA 2000 bus. In some implementations, the marine electronics device 500 may be capable of steering a vessel and controlling the speed of the vessel, i.e., autopilot. For instance, one or more waypoints may be input to the marine electronics device 500, and the marine electronics device 500 may be configured to steer the vessel to the one or more waypoints. Further, the marine electronics device 500 may be configured to transmit and/or receive NMEA 2000 compliant messages, messages in a proprietary format that do not interfere with NMEA 2000 compliant messages or devices, or messages in any other format. In various other implementations, the marine electronics device 500 may be attached to various other communication buses and/or networks configured to use various other types of protocols that may be accessed via, e.g., NMEA 2000, NMEA 0183, Ethernet, Proprietary wired protocol, etc.

The marine electronics device 500 may be operational with numerous general purpose or special purpose computing system environments and/or configurations. The marine electronics device 500 may include any type of electrical and/or electronics device capable of processing data and information via a computing system. The marine electronics device 500 may include various marine instruments, such that the marine electronics device 500 may use the computing system to display and/or process the one or more types of marine electronics data. The device 500 may display sonar data 262, for example, sonar and sensor data, and images associated with them. The marine electronic data types may include various chart data, radar data, sonar data 262, sensor data including environmental, steering data, dashboard data, navigation data, fishing data, engine data, and the like. The marine electronics device 500 may include one or more buttons 520, which may include physical buttons or virtual buttons, or some combination thereof. The marine electronics device 500 may receive input through a screen 505 sensitive to touch or buttons 520.

In some implementations, according to various techniques described herein, the marine electronics device 500 may be configured to simultaneously display images associated with one or more sonar transducer elements, environmental sensors, and the like. For example, the marine electronics device 500 may be configured to simultaneously display images associated with a plurality of sonar transducer elements, including sonar transducer elements which produces monotonic or CHIRP-enabled sonar beams. Further, the marine electronics device 500 may also be configured to simultaneously display images and/or data associated with various status indicators. For example, the battery level of a rechargeable battery 274 encapsulated within a sonar device 110. In some instances, in various display modes of operation, the marine electronics device 500 may be configured to simultaneously display images and/or data associated with the marine environmental on the screen 505.

The marine electronics device 500 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. Further, the GPU may generate user interfaces, including graphical user interfaces (GUIs) that provide, present, and/or display the output data. The GPU may also provide objects, such as menus, in the GUI. In some instances, a user may provide input by interacting with objects, and the GPU may receive input from interaction with objects and provide the received input to the CPU. Further, in some instances, a video adapter may be provided to convert graphical data into signals for a monitor, such as, e.g., a multi-function display (MFD 500). The monitor (i.e., MFD 500) includes a screen 505. In various instances, the screen 505 may be sensitive to touch by a human finger, or the screen 505 may be sensitive to body heat from a human finger, a stylus, or responsive to a mouse.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. For example, the system may be configured to have a physical or virtual button dedicated to enabling of disabling the CHIRP sonar capability of a sonar device 110. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured for connection to a GPS receiver system and/or a marine electronics device or system. The GPS system and/or marine electronics device or system may be connected via a network interface. For instance, the GPS receiver system may be used to determine position data for the vessel on which the marine electronics device 500 is disposed. Further, the GPS receiver system may transmit position data to the marine electronics device 500. In other instances, any positioning system known to those skilled in the art may be used to determine and/or provide the position data for the marine electronics device 500.

The marine electronics device 500 may receive external data via a LAN or a WAN. In some implementations, external data may relate to information not available from various marine electronics systems. The external data may be retrieved from the Internet or any other source. The external data may include atmospheric temperature, atmospheric pressure, tidal data, weather, temperature, moon phase, sunrise, sunset, water levels, historic fishing data, and/or various other fishing data.

In one implementation, the marine electronics device 500 may be a multi-function display (MFD) unit, such that the marine electronics device 500 may be capable of displaying and/or processing multiple types of marine electronics data. FIG. 5 illustrates a schematic diagram of an MFD unit in accordance with implementations of various techniques described herein. In particular, the MFD unit may include the computing system, the monitor (MFD 500), the screen 505, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are either objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A castable sonar device for imaging an underwater environment, the castable sonar device comprising:
   a housing having:
      a buoyant component;
      a global positioning system (GPS) module configured to generate location data corresponding to the location of the castable sonar device;
      a sonar transducer element configured to produce compressed high intensity radar pulse (CHIRP) sonar and produce sonar data corresponding to the underwater environment relative to the castable sonar device; and
      a wireless data communication module for communicating with one or more wireless computing devices enabled to display sonar images, wherein the wireless data communication module is configured to transmit the sonar data and the location data to the one or more wireless computing devices, wherein the wireless data communication module is further configured to:
         receive an instruction to provide location data for retrieval of the castable sonar device; and
         transmit, in response to receiving the instruction, location data corresponding to a current location of the castable sonar device to the one or more wireless computing devices.

2. The castable sonar device of claim 1, wherein the housing further comprises a CHIRP-enabled processor.

3. The castable sonar device of claim 1, wherein the one or more wireless computing devices enabled to display sonar images is a marine electronics device configured to connect to a National Marine Electronics Association (NMEA) network.

4. The castable sonar device of claim 1, wherein the housing is waterproof.

5. A castable sonar device for imaging an underwater environment, the castable sonar device comprising:
   a housing having:
      a buoyant component;
      a global positioning system (GPS) module configured to generate location data corresponding to the location of the castable sonar device;
      a down-scan transducer configured to produce sonar data corresponding to the underwater environment relative to the castable sonar device; and
      a wireless data communication module for communicating with one or more wireless computing devices enabled to display sonar images, wherein the wireless data communication module is configured to transmit the sonar data and the location data to the one or more wireless computing devices, wherein the wireless data communication module is further configured to:
         receive an instruction to provide location data for retrieval of the castable sonar device; and
         transmit, in response to receiving the instruction, location data corresponding to a current location of the castable sonar device to the one or more wireless computing devices.

6. The castable sonar device of claim 5, wherein the housing further comprises a GPS module.

7. The castable sonar device of claim 5, wherein the housing further comprises a sonar transducer element configured to produce CHIRP sonar.

8. The castable sonar device of claim 5, wherein the wireless computing devices enabled to display sonar images is a marine electronics device configured to connect to a NMEA network.

9. The castable sonar device of claim 5, wherein the housing is waterproof.

10. A castable sonar device for imaging an underwater environment, the castable sonar device comprising:
    a waterproof housing having:
       a buoyant component;

a global positioning system (GPS) module configured to generate location data corresponding to the location of the castable sonar device;

a side-scan sonar transducer element configured to produce sonar data corresponding to the underwater environment relative to the castable sonar device; and a wireless data communication module for communicating with one or more wireless computing devices enabled to display sonar images, wherein the wireless data communication module is configured to transmit the sonar data and the location data to the one or more wireless computing devices, wherein the wireless data communication module is further configured to:
  receive an instruction to provide location data for retrieval of the castable sonar device; and
  transmit, in response to receiving the instruction, location data corresponding to a current location of the castable sonar device to the one or more wireless computing devices.

11. The castable sonar device of claim 10, wherein the waterproof housing further comprises a motor configured to spin the sonar device while the side scan sonar transducer element operates.

12. The castable sonar device of claim 10, wherein the waterproof housing further comprises a sonar transducer element configured to produce CHIRP sonar.

13. The castable sonar device of claim 10, wherein the one or more wireless computing devices enabled to display sonar images is a marine electronics device configured to connect to a NMEA network.

14. A castable device for imaging an underwater environment, the castable device comprising:
  a waterproof housing having:
    a buoyant component;
    a global positioning system (GPS) module configured to generate location data corresponding to the location of the castable device;
    a camera configured to generate camera data corresponding to the underwater environment relative to the castable device;
    a light; and
    a wireless data communication module for communicating with one or more wireless computing devices enabled to display images, wherein the wireless data communication module is configured to transmit the camera data and the location data to the one or more wireless computing devices, wherein the wireless data communication module is further configured to:
      receive an instruction to provide location data for retrieval of the castable device; and
      transmit, in response to receiving the instruction, location data corresponding to a current location of the castable device to the one or more wireless computing devices.

15. The castable device of claim 14, wherein the waterproof housing further comprises a down-scan transducer.

16. The castable device of claim 14, wherein the waterproof housing further comprises a sonar transducer element configured to produce CHIRP sonar.

17. The castable device of claim 14, wherein the waterproof housing further comprises a motor configured to spin the device while the camera operates.

18. The castable device of claim 14, wherein the wireless computing devices enabled to display images is a marine electronics device configured to connect to a NMEA network.

19. The castable sonar device of claim 1, wherein the location data was recorded for a location corresponding to receipt of the sonar data, and wherein the location data is associated with the sonar data when transmitted to the one or more wireless computing devices.

* * * * *